United States Patent
Morishita

(10) Patent No.: US 9,875,393 B2
(45) Date of Patent: Jan. 23, 2018

(54) INFORMATION PROCESSING APPARATUS, INFORMATION PROCESSING METHOD, AND PROGRAM

(71) Applicant: NEC Corporation, Tokyo (JP)

(72) Inventor: Yusuke Morishita, Tokyo (JP)

(73) Assignee: NEC Corporation, Tokyo (JP)

( * ) Notice: Subject to any disclaimer, the term of this patent is extended or adjusted under 35 U.S.C. 154(b) by 115 days.

(21) Appl. No.: 14/619,182

(22) Filed: Feb. 11, 2015

(65) Prior Publication Data

US 2015/0227781 A1    Aug. 13, 2015

(30) Foreign Application Priority Data

Feb. 12, 2014   (JP) ................................. 2014-024655

(51) Int. Cl.
*G06K 9/00* (2006.01)

(52) U.S. Cl.
CPC ..... *G06K 9/00268* (2013.01); *G06K 9/00899* (2013.01)

(58) Field of Classification Search
None
See application file for complete search history.

(56) References Cited

U.S. PATENT DOCUMENTS 6,570,612 B1 *   5/2003   Saund .................. H04N 1/3876
                                                                348/218.1

FOREIGN PATENT DOCUMENTS

| JP | 3-188574 | 8/1991 |
|---|---|---|
| JP | 2001-184490 | 7/2001 |
| JP | 2007-280367 | 10/2007 |
| JP | 2008-90452 | 4/2008 |
| JP | 4734980 | 5/2011 |
| JP | 5035467 | 7/2012 |
| JP | 2012-239661 | 12/2012 |

OTHER PUBLICATIONS

Wu et al, Eulerian Video Magnification for Revealing Subtle Changes in the World, SIGGRAPH 2012.*
Kahm et al, "The 2nd Competition on Counter Measures to 2D Face Spoofing Attacks", 2013 IEEE.*
Chingovska et al, Anti-Spoofing in action: joint operation with a verification system, CVPR2013.*
Merriam Webster, definition "only".*
Poh, "Non-contact, automated cardiace pulse measurements using video imaging and blind source separation", Optical Society of America 2010.*
International Search Report and Written Opinion dated May 26, 2015 in corresponding PCT International Application No. PCT/JP2015/000628.

* cited by examiner

*Primary Examiner* — Mark Roz
(74) *Attorney, Agent, or Firm* — Finnegan, Henderson, Farabow, Garrett & Dunner, L.L.P.

(57) ABSTRACT

An information processing apparatus, method, and non-transitory computer-readable storage medium are disclosed. The information processing apparatus may include a memory storing instructions; and one or more processors configured to process the instructions to extract color information from a face image sequence, determine temporal variations in the extracted color information, and determine whether a face contained in the face image sequence is a spoofing based on the determined temporal variations.

24 Claims, 4 Drawing Sheets

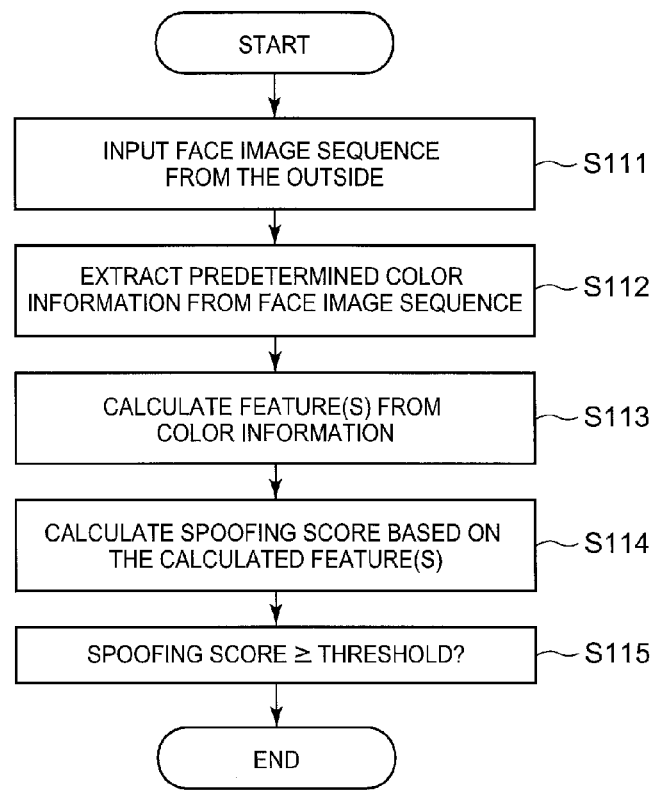
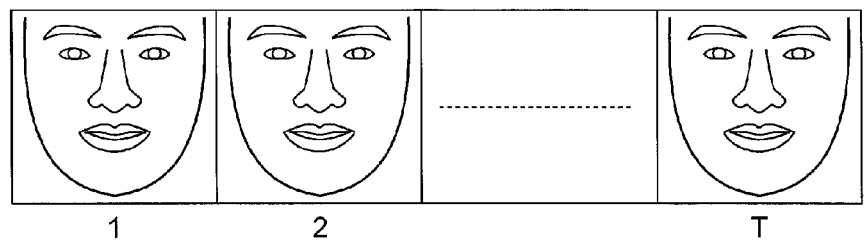

INFORMATION PROCESSING APPARATUS, INFORMATION PROCESSING METHOD, AND PROGRAM

CROSS-REFERENCE TO RELATED PATENT APPLICATION

This application is based upon and claims the benefit of priority from Japanese Patent Application No. 2014-024655, filed on Feb. 12, 2014, the entire disclosure of which is incorporated herein by reference.

BACKGROUND

Technical Field

The disclosure generally relates to facial authentication technology and more specifically to, techniques for determining spoofing.

Description of the Related Art

In connection with security systems using facial authentication, techniques for detecting a spoofing, which is an act of attempting unauthorized use of a system by pretending to be someone else, are widely known.

For instance, a related art documents discloses a method for living body detection based on determination of the magnitude of variations in facial expression, such as blinking.

Another related art document discloses a method for living body detection by extracting multiple feature points from face images captured by two or more cameras positioned at different angles and deciding whether the feature points are on the same plane or not.

Another related art document discloses a method for determining whether a presented face is a spoofing or not by measuring the distance to the face with three sensors including infrared sensor(s) and assessing the flatness of the face.

Another related art document discloses a technique for measuring heart rate by extracting components representing a pulse from variations in the RGB color components of captured face images by means of independent component analysis.

The techniques described in the above related art documents, however, may not be able to detect a spoofing that is conducted by wearing an elaborate disguise mask. Specifically, since it may be possible to cut a disguise mask around part of the eyes or the mouth, movement of a part of the face such as blinking can be detected. Accordingly, a facial authentication system may not be able to detect such a disguise mask as a spoofing.

Further, since a disguise mask is three-dimensionally shaped and has projections and depressions like a human face, the facial authentication system may not be able to detect a disguise mask as a spoofing.

SUMMARY

Exemplary embodiments of the present disclosure may solve one or more of the above-noted problems. For example, the exemplary embodiments may accurately detect a spoofing, which is conducted by presenting a fake face at the time of facial authentication in a facial authentication system.

According to a first aspect of the present disclosure, an information processing apparatus is disclosed. The information processing apparatus may include a memory storing instructions; and one or more processors configured to process the instructions to extract color information from a face image sequence, determine temporal variations in the extracted color information, and determine whether a face contained in the face image sequence is a spoofing based on the determined temporal variations.

An information processing method according to another aspect of the present disclosure may include extracting color information from a face image sequence, determining temporal variations in the extracted color information, and determining whether a face contained in the face image sequence is a spoofing based on the determined temporal variations.

A non-transitory computer-readable storage medium may store instructions that when executed by a computer enable the computer to implement a method. The method may include extracting color information from a face image sequence, determining temporal variations in the extracted color information, and determining whether a face contained in the face image sequence is a spoofing based on the determined temporal variations.

BRIEF DESCRIPTION OF THE DRAWINGS

FIG. 2 is a flowchart illustrating exemplary operations of a spoofing detection process performed by the spoofing detection apparatus of FIG. 1;

FIG. 3 schematically illustrates an example of a face image sequence that can be processed by the exemplary spoofing detection apparatus of FIG. 1;

DETAILED DESCRIPTION

A spoofing against a facial authentication system may be conducted by presenting a fake face to the facial authentication system camera which captures a face image. Such a different or fake face may be presented by 1) presenting a picture of another person's face to the system camera, 2) displaying an image of another person's face on the display of a smartphone or the like and presenting the display to the system camera, or 3) attaching a disguise mask (representing another person's face) to the system user's face and presenting the mask to the system camera, for example.

For such spoofing acts, various countermeasure techniques have been proposed, including the first three patent documents mentioned above. Specifically, such techniques include a scheme that relies on movement of the face or a part thereof and determines that a presented face is a spoofing if no movement is observed (a countermeasure against presentation of a face picture), a scheme that captures face images with two or more cameras and determines that the presented face is a spoofing if the captured face is not a three-dimensional object (a countermeasure against presentation of a face picture, a smartphone display or the like), and a scheme that uses information other than visible light obtained with such as a near-infrared camera for determination of a spoofing (a countermeasure against presentation of a face picture, a display and the like).

These techniques however may not be able to detect a spoofing that is conducted by wearing a disguise mask. Exemplary techniques disclosed herein may determine whether a presented face is a spoofing based on information derived from variations in bloodstream or the like that is measured from face images. When images of a real human being are captured in a facial authentication system, temporal color variations may occur locally in a particular color component in the face images. In contrast, when the face is covered with a disguise mask with the aim of spoofing, the material of the disguise mask instead of the facial skin comes to the front and is captured as a face image. Accordingly, when a disguise mask is worn, color variations in face images may be small and may not localize in a particular color component. Exemplary embodiments of the present disclosure may take into account this novel insight to determine a spoofing by detecting whether a captured face represents a real human or not.

First Embodiment

Figure 1:
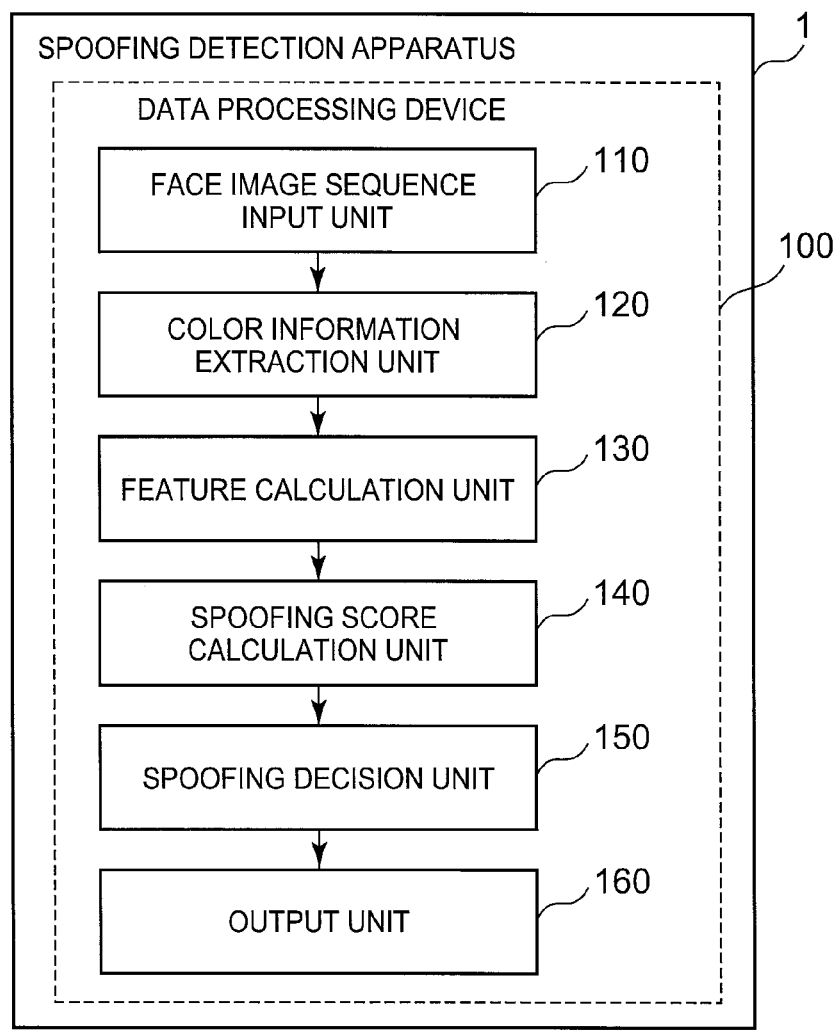
FIG. 1 is a block diagram showing an exemplary configuration of a spoofing detection apparatus.

FIG. 1 is a block diagram showing an exemplary configuration of a spoofing detection apparatus 1 for detecting a spoofing against a facial authentication system. The spoofing detection apparatus 1 shown in FIG. 1 may include a data processing device 100.

Data processing device 100 may include a face image sequence input unit 110, a color information extraction unit 120, a feature calculation unit 130, a spoofing score calculation unit 140, a spoofing decision unit 150, and an output unit 160.

Face image sequence input unit 110 may receive as input time-series of multiple face images (hereinafter also referred to as "face image sequence") from outside. A face image sequence may be a series of human face images captured at certain time intervals. Face image sequence input unit 110 may accept external input of a face image sequence which contains the face portion clipped out in advance, or accept a face image sequence which is generated by clipping out the face portion from multiple images captured by a general monitoring camera. Face images input by face image sequence input unit 110 may be RGB images formed from color components representing R (red), G (green), and B (blue), or any other images from which color information can be extracted. The following description assumes that face image sequence input unit 110 inputs RGB images.

Color information extraction unit 120 may extract predetermined color information from the face image sequence input by face image sequence input unit 110. The predetermined color information to be extracted may be the R, G, and B color components of each face image of the face image sequence, or one or more color components generated by color space conversion of the RGB color components. Alternatively, the predetermined color information may be values obtained by averaging G and B components out of the R, G, and B components across the entire face image. Alternatively, the predetermined color information may be simple averages of several color components across the entire face image, or averages calculated with weights assigned to facial parts, such as the forehead, the cheeks, and the nose for example. A storage (not shown) may store the facial characteristics of persons, and color information extraction unit 120 may use varied weights on a person-by-person basis by referencing the facial characteristics stored in the storage.

Feature calculation unit 130 may calculate one or more features from the color information extracted by color information extraction unit 120. The feature(s) calculated by feature calculation unit 130 may be the frequency spectrum of color information.

Spoofing score calculation unit 140 may calculate a score indicating whether a presented face is a spoofing according to a predetermined evaluation function from the feature(s) calculated by feature calculation unit 130.

Spoofing decision unit 150 may determine whether the face contained in the face image sequence is a spoofing or not based on temporal variations of the predetermined color information extracted from the face image sequence. Specifically, spoofing decision unit 150 may decide whether the face contained in the face image sequence input by the face image sequence input unit 110 is a spoofing by comparing the score calculated by spoofing score calculation unit 140 with a predetermined threshold.

The output unit 160 may output the result of determination by the spoofing decision unit 150 to the outside.

Exemplary operations of a spoofing detection process in this embodiment are now described with reference to the flowchart in FIG. 2. FIG. 2 is a flowchart illustrating exemplary operations of a spoofing detection process that may be implemented by spoofing detection apparatus 1 in the course of facial authentication.

In step S111, face image sequence input unit 110 may input time-series RGB images of a face from the outside. For example, the time-series RGB images may be captured by a camera of a facial authentication system of which spoofing detection apparatus 1 is a part.

In step 112, color information extraction unit 120 may extract predetermined color information from the face image sequence input by face image sequence input unit 110.

In step 113, feature calculation unit 130 may calculate feature(s) from the color information extracted by color information extraction unit 120. The feature(s) may be calculated based on temporal variations in the extracted color information.

In step 114, spoofing score calculation unit 140 may calculate a score indicating whether the face is a spoofing or not according to a predetermined evaluation function applied to the feature(s) calculated by feature calculation unit 130.

In step 115, spoofing decision unit 150 may compare the score calculated in step 114 with a predetermined threshold to decide whether the input face image sequence input represents a spoofing.

The above exemplary operations will now be described with reference to a specific example. This example illustrates a case where a face image sequence depicted in FIG. 3 is input to spoofing detection apparatus 1. As an example, in step 111, face image sequence input unit 110 may receive as input the face image sequence of FIG. 3 that may be a time-series of face images from time 1 to time T. These face images may be input from a camera, a video camera, of moving picture data prestored in an HDD or the like.

In this example, the face image sequence may be a series of images containing the face portion clipped out from RGB images formed of R (red), G (green), and B (blue) color components captured at certain time intervals. In an embodiment, the face image sequence may be one in which the face portion has been clipped out in advance by face image sequence unit 110. Alternatively, face image sequence input unit 110 may determine the position of the face in these images by employing a known face detection technique and clip out the face portion beforehand in accordance with the face position.

Figure 4:
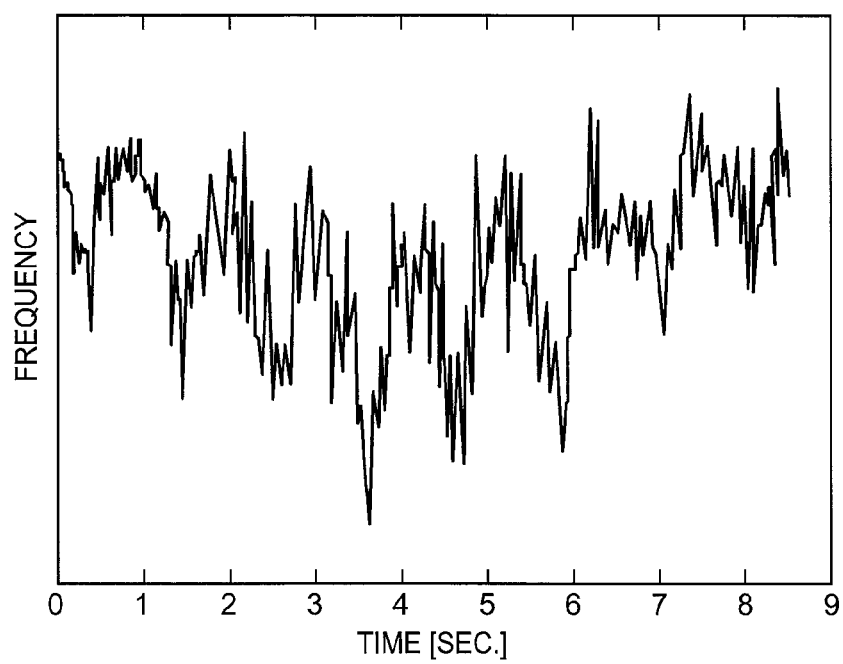
FIG. 4 illustrates an example of color information which may be extracted by a color information extraction unit of the exemplary spoofing detection apparatus of FIG. 1.

In step 112, color information extraction unit 120 may extract predetermined color information from the face image sequence. The predetermined color information may be the R, G, and B color components of each face image in the face image sequence, or one or more color components generated by color space conversion, such as into HSV color space, of the RGB color components. Alternatively, the predetermined color information may be values obtained by averaging G and B components out of the R, G, and B components across the entire face image. That is, color information extraction unit 120 may calculate one average value for G and one average value for B per face image. Accordingly, from a face image sequence having a length of T (i.e., T face images), T average values for G and T average values for B may be calculated. These 'T' values may provide a temporal variation in G and B components. As an example, FIG. 4 illustrates an average of a color component (G here) extracted from face images contained in a face image sequence which resulted from taking pictures of a human face for a certain time period. FIG. 4 illustrates that the average G component extracted from a face image sequence varies over time.

When a face image sequence input by the face image sequence input unit 110 was captured in an outdoor environment in which illumination conditions were not constant, variations in the intensity values of the face image sequence may be unstable. In such a case, for example, the predetermined color information may be G and the sum of B and R divided by 2 ((B+R)/2) instead of G and B as mentioned above.

Under variable environmental conditions, such as unstable illumination conditions, a sensor or the like (not illustrated) may acquire environment information, and color information extraction unit 120 may extract the predetermined color information in varied proportions in accordance with the environment information.

It will be understood that the above are only examples of color information extraction and are not intended to be limiting.

Figure 5:
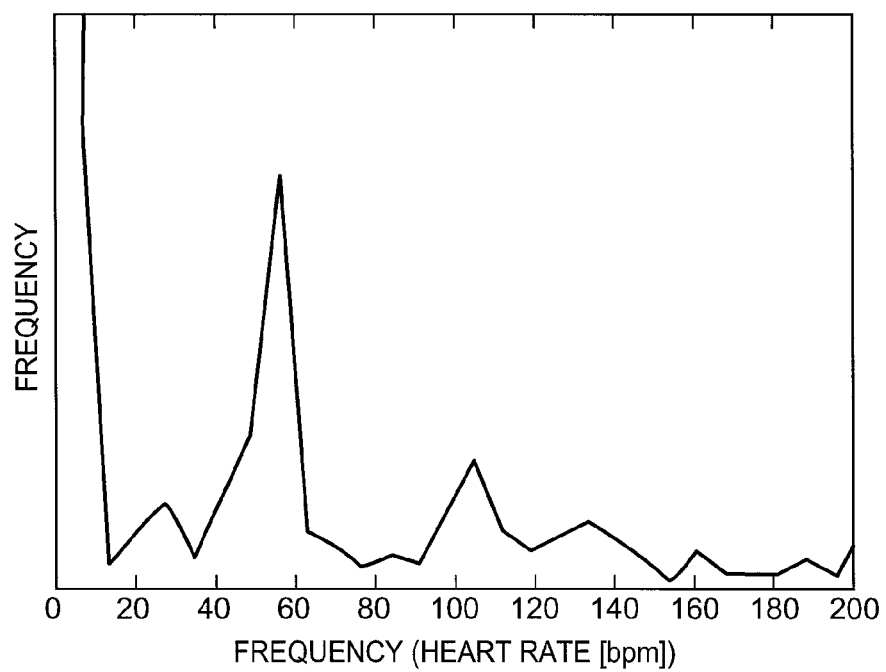
FIG. 5 illustrates an example of a frequency spectrum determined by a feature calculation unit of the exemplary spoofing detection apparatus of FIG. 1 from the color information of FIG. 4 through FFT.

In step 113, feature calculation unit 130 may calculate a feature from the color information extracted by color information extraction unit 120. As an example, feature calculation unit 130 may calculate a frequency spectrum from temporal variations in the extracted color information. For example, feature calculation unit 130 may employ an FFT (Fast Fourier Transform), an algorithm for quickly calculating discrete Fourier transform on a computer, or maximum entropy, for calculation of frequency spectra. FIG. 5 illustrates an exemplary frequency spectrum determined by feature calculation unit 130 through FFT from the color information in FIG. 4. In the example illustrated in FIG. 5, a large peak is seen around 55 on the horizontal axis (frequency (heart rate)). This indicates that color variations in face images associated with variations in bloodstream occur at a frequency of about 55 times per minute: this frequency of variation represents the human pulse.

In step 114, spoofing score calculation unit 140 may calculate a score indicating whether the face is a spoofing by applying a predetermined evaluation function to the feature(s) calculated by feature calculation unit 130 in step 113. An exemplary evaluation function and score calculation is discussed next.

Assume that $x_i^{(G)}$ denotes time-series data for the G (green) component and $x_i^{(B)}$ denotes time-series data for the B (blue) component in the extracted color information. Feature calculation unit 130 may calculate frequency spectra $f_j^{(G)}, f_j^{(B)}$ corresponding to the extracted color information using a function FFT for FFT processing according to Formula 1:

$$f_j^{(G)} = \text{FFT}[x_t^{(G)}]$$

$$f_j^{(B)} = \text{FFT}[x_t^{(B)}] \qquad \text{[Formula 1]}$$

Spoofing score calculation unit 140 may calculate indices $F_G$, $F_B$ according to Formula 2 (see below) based on the frequency spectra $f_j^{(G)}, f_j^{(B)}$ from Formula 1. The terms $v_A$, $v_B$ and $v_C$ in Formula 2 may represent spectrum frequency ranges used for calculation of the indices $F_G$, $F_B$. The range from $v_A$ to $v_B$ may represent the frequency range corresponding to the human pulse, and the range from $v_B$ to $v_C$ may represent the frequency range corresponding to components other than the pulse, namely noise components. The indices $F_G$ and $F_B$ may each represent the ratio between the frequencies corresponding to noise and the frequencies corresponding to the pulse.

$$F_G = \frac{\sum_{j=v_A}^{v_B} f_j^{(G)}}{\sum_{j=v_B}^{v_C} f_j^{(G)}} \qquad \text{[Formula 2]}$$

$$F_B = \frac{\sum_{j=v_A}^{v_B} f_j^{(B)}}{\sum_{j=v_B}^{v_C} f_j^{(B)}}$$

Spoofing score calculation unit 140 may calculate a score J which indicates whether the face is a spoofing according to Formula 3 below. $F_B - F_G$ as the numerator means that the resulting value is lower when the green component contains a higher ratio of frequencies corresponding to the human pulse relative to the blue component. Division by $F_B + F_G$ makes the score J assume a value from −1 to +1, meaning that a greater value of J indicates a higher possibility of spoofing.

$$J = \frac{F_B - F_G}{F_B + F_G} \qquad \text{[Formula 3]}$$

In step 115, spoofing decision unit 150 may compare the score J calculated by spoofing score calculation unit 140 with a predetermined threshold to decide whether the face contained in the face image sequence input by the face image sequence input unit 110 is a spoofing or not.

In the above-described example, the score calculated by spoofing score calculation unit 140 is designed to be low when the face image sequence input by the face image sequence input unit 110 represents a real human face and high when it is not a real human face, such as a face wearing a disguise mask. Thus, the score calculated by spoofing score calculation unit 140 may compared to an established threshold, and the face is determined to a human face when the score is below the threshold and a spoofing when the score exceeds the threshold.

The threshold employed by the spoofing decision unit 150 may be varied according to application. For example, for an application in which failing to catch a person wearing a disguise mask is fatal, a higher threshold may be established. In contrast, for an application in which erroneously determining a real human face as a spoofing is problematic, a lower threshold may be established.

The way of calculating the spoofing score described above is merely illustrative and is not limiting. Feature calculation unit 130, spoofing score calculation unit 140, and spoofing decision unit 150 may determine a spoofing using a feature, score, and threshold which are different from the above specific example and are parameters relating to predetermined color information.

Second Embodiment

Figure 6:
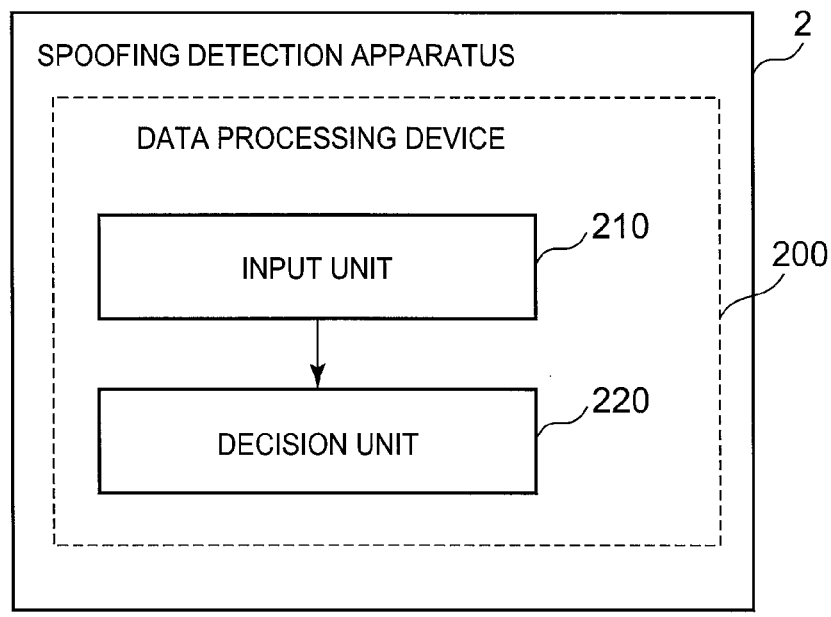
FIG. 6 is a block diagram showing another exemplary configuration of a spoofing detection apparatus.

Turning now to FIG. 6, the functional configuration of a spoofing detection apparatus 2 according to a second embodiment is described.

FIG. 6 is a block diagram illustrating the configuration of spoofing detection apparatus 2. As shown in the FIG. 6, the spoofing detection apparatus 2 may include a data processing device 200. The data processing device 200 may include an input unit 210 and a decision unit 220. Input unit 210 may input a face image sequence captured over a predetermined time period. Decision unit 220 may determine whether the face contained in the face image sequence is a spoofing or not based on temporal variations of predetermined color information extracted from the face image sequence. The operations of decision unit 220 may be similar to the above-described operations of data processing device 100.

A program according to the second embodiment may be a program that causes a computer to execute the operations described above.

As has been described, with the spoofing detection apparatus, spoofing detection method, and program according to the second embodiment, even a spoofing conducted by wearing an elaborate disguise mask may be correctly detected.

The components of the exemplary spoofing detection apparatuses in the above embodiments may be formed of a control unit, memory, programs loaded into memory, a storage unit such as hard disk for storing the programs, a network connection interface, and the like, and may be implemented in an arbitrary combination of hardware and software.

The control unit may include a CPU (central processing unit) and other components and may cause an operating system to run to control the entire spoofing detection apparatus. The control unit may also read programs or data from a recording medium attached to a drive device into memory, for example, and execute various kinds of processing according to the read program or data.

The recording medium may be, for example, an optical disk, a flexible disk, magneto-optical disk, external hard disk, semiconductor memory and the like, and records a computer program in a computer readable manner. The computer program may be downloaded from an external computer (not illustrated) connected to a communication network.

FIGS. 1 and 6 illustrate blocks as functional units, rather than hardware units. These functional blocks may be implemented by a certain combination of hardware and software. While components of the embodiments are depicted in these figures as being implemented by a single device that is physically integrated, the way of implementation is not limited. For example, two or more physically separate devices may be connected by wire or wirelessly and the devices may implement the systems of the embodiments.

It will be apparent to those skilled in the art that various modifications and variations can be made to the disclosed embodiments. Other embodiments will be apparent to those skilled in the art from consideration of the specification and practice of the disclosed techniques. It is intended that the specification and examples be considered as exemplary only, with a true scope being indicated by the following claims and their equivalents.

What is claimed is:

1. An information processing apparatus comprising:
a memory storing a set of instructions; and
one or more processors configured to execute the set of instructions to:
extract color information from a face image sequence;
determine temporal variations based on exactly two color components in the extracted color information; and
determine whether a face contained in the face image sequence is a spoofing based on the determined temporal variations.

2. The information processing apparatus according to claim 1, wherein the one or more processor are configured to execute the set of instructions to:
determine that the face is a spoofing in response to determining that the temporal variations are not based on a human pulse.

3. The information processing apparatus according to claim 1, wherein the color information includes a green color component and a blue color component.

4. The information processing apparatus according to claim 3, wherein the color information includes, for each face image in the face image sequence, a first average value of the green color component and a second average value of the blue color component calculated across an entire portion of the face image.

5. The information processing apparatus according to claim 3, wherein the color information includes, for each face image in the face image sequence, a first weighted average value of the green color component and a second weighted average value of the blue color component where the first and second weighted average values are calculated using weights assigned to facial parts contained in each face image.

6. The information processing apparatus according to claim 1, wherein the one or more processor are further configured to execute the set of instructions to:
calculate at least one feature based on the determined temporal variations,
calculate a score by applying an evaluation function to the at least one feature, and
determine whether the face contained in the input face image sequence is a spoofing or not by comparing the score with a predetermined threshold.

7. The information processing apparatus according to claim 6, wherein the at least one feature is a frequency spectrum of the determined temporal variations.

8. The information processing apparatus according to claim 7, wherein the one or more processor are further configured to execute the set of instructions to calculate the score by calculating, for the frequency spectrum, a ratio between a total spectral intensity within a first frequency segment and a total spectral intensity within a second frequency segment.

9. An information processing method comprising:
extracting color information from a face image sequence;
determining temporal variations based on exactly two color components in the extracted color information; and
determining whether a face contained in the face image sequence is a spoofing based on the determined temporal variations.

10. The method according to claim 9, wherein the face is determined to be a spoofing when the temporal variations are not based on a human pulse.

11. The method according to claim 9, wherein the color information includes a green color component and a blue color component.

12. The method according to claim 11, wherein the color information includes, for each face image in the face image sequence, a first average value of the green color component and a second average value of the blue color component calculated across an entire portion of the face image.

13. The method according to claim 11, wherein the color information includes, for each face image in the face image sequence, a first weighted average value of the green color component and a second weighted average value of the blue color component where the first and second weighted average values are calculated using weights assigned to facial parts contained in each face image.

14. The method according to claim 9, further comprising:
calculating at least one feature based on the determined temporal variations,
calculating a score by applying an evaluation function to the at least one feature, and
determining whether the face contained in the input face image sequence is a spoofing or not by comparing the score with a predetermined threshold.

15. The method according to claim 12, wherein the at least one feature is a frequency spectrum of the determined temporal variations.

16. The method according to claim 15, wherein the score is calculated by calculating, for the frequency spectrum, a ratio between a total spectral intensity within a first frequency segment and a total spectral intensity within a second frequency segment.

17. A non-transitory computer-readable storage medium storing instructions that when executed by a computer enable the computer to implement a method comprising:
extracting color information from a face image sequence;
determining temporal variations based on exactly two color components in the extracted color information; and
determining whether a face contained in the face image sequence is a spoofing based on the determined temporal variations.

18. The non-transitory computer-readable storage medium according to claim 17, wherein the face is determined to be a spoofing when the temporal variations are not based on a human pulse.

19. The non-transitory computer-readable storage medium according to claim 17, wherein the color information includes a green color component and a blue color component.

20. The non-transitory computer-readable storage medium according to claim 19, wherein the color information includes, for each face image in the face image sequence, a first average value of the green color component and a second average value of the blue color component calculated across an entire portion of the face image.

21. The information processing apparatus according to claim 1, wherein one of the exactly two color components is green.

22. The information processing apparatus according to claim 1, wherein one of the exactly two color components is blue.

23. The information processing apparatus according to claim 1, wherein the exactly two color components are green and blue.

24. The information processing apparatus according to claim 1, wherein the temporal variations are further determined based on a first frequency spectral range corresponding to a human pulse, and a second frequency spectral range corresponding to noise components other than the pulse.

* * * * *